(12) United States Patent (10) Patent No.: US 12,688,767 B2
Zhijian et al. (45) Date of Patent: *Jul. 21, 2026

(54) POSITION LOCATOR

(71) Applicant: Li Zhijian, Buffalo, NY (US)

(72) Inventors: Li Zhijian, Fujian (CN); Xuan Chao, Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/243,126

(22) Filed: Sep. 7, 2023

(65) Prior Publication Data

US 2024/0096196 A1 Mar. 21, 2024

Related U.S. Application Data

(63) Continuation-in-part of application No. 17/884,336, filed on Aug. 9, 2022, now Pat. No. 11,789,125, which is a continuation of application No. 17/573,677, filed on Jan. 12, 2022, now Pat. No. 11,573,291, and a continuation of application No. 17/510,438, filed on Oct. 26, 2021, now Pat. No. 11,475,756.

(30) Foreign Application Priority Data

Sep. 10, 2021 (CN) .......................... 202111063066.1
Jun. 23, 2022 (CN) .......................... 202221606848.5

(51) Int. Cl.
| | |
|---|---|
| *G08B 21/24* | (2006.01) |
| *G01S 7/481* | (2006.01) |
| *G01S 17/46* | (2006.01) |
| *G08B 3/10* | (2006.01) |

(52) U.S. Cl.
CPC ............ *G08B 21/24* (2013.01); *G01S 7/4813* (2013.01); *G01S 17/46* (2013.01); *G08B 3/1083* (2013.01)

(58) Field of Classification Search
None
See application file for complete search history.

(56) References Cited

U.S. PATENT DOCUMENTS

| | | |
|---|---|---|
| 4,721,384 A | 1/1988 | Dietrich |
| 4,876,446 A | 10/1989 | Kambe |

(Continued)

FOREIGN PATENT DOCUMENTS

WO WO-2010022666 A1 * 3/2010 ............ G01C 3/085

*Primary Examiner* — Fekadeselassie Girma
(74) *Attorney, Agent, or Firm* — Lippes Mathias LLP

(57) ABSTRACT

A multifunctional position locator with a body, a hardware piece attached to the body, a base case removably attached to the hardware with at least one power contact and an NFC sensor, a position locator removably attached to the base case and having at least one position locator power contact, the position locator has at least one light-transmitting through-hole provided with a light source inside of the position locator and light from the light source is projected outward through at least one of the light-transmitting through-holes, the hardware has a hardware opening and the position of the light-transmitting through-hole is matched with hardware opening, the body has a body opening that is at least the same size or larger than the hardware light-transmitting through-hole and the body opening is substantially aligned with the hardware opening and the light-transmitting channel when the hardware is attached to the body.

19 Claims, 25 Drawing Sheets

(56) References Cited

U.S. PATENT DOCUMENTS

| | | | |
|---|---|---|---|
| 4,970,384 A | 11/1990 | Kambe | |
| 6,850,151 B1 | 2/2005 | Calhoun | |
| 7,081,807 B2 | 7/2006 | Lai | |
| 7,738,192 B1 | 6/2010 | Tobey | |
| 9,383,434 B2 | 7/2016 | Bouchilloux | |
| 9,961,523 B1* | 5/2018 | Daoura | H04W 4/185 |
| 10,257,708 B1 | 4/2019 | Kamkar | |
| 10,488,518 B2 | 11/2019 | Geiger | |
| 10,779,121 B2 | 9/2020 | Hirade | |
| 10,823,828 B2 | 11/2020 | Mori | |
| 10,921,417 B2 | 2/2021 | Johnson | |
| 11,475,756 B1* | 10/2022 | Zhijian | G01S 7/4813 |
| 11,630,214 B2 | 4/2023 | Gausebeck | |
| 2009/0233735 A1* | 9/2009 | Savarese | G08B 21/0266 |
| | | | 473/407 |
| 2010/0164405 A1 | 7/2010 | Tobey | |
| 2011/0156862 A1 | 6/2011 | Langer | |
| 2011/0266977 A1 | 11/2011 | Tobey | |
| 2012/0214545 A1* | 8/2012 | Johnson | H04M 1/2155 |
| | | | 340/539.32 |
| 2014/0035754 A1 | 2/2014 | Thielman | |
| 2014/0225132 A1* | 8/2014 | Livesay | H10H 20/8581 |
| | | | 257/88 |
| 2014/0226317 A1* | 8/2014 | Livesay | F21S 8/026 |
| | | | 362/147 |
| 2015/0204652 A1* | 7/2015 | Olsson | G01J 3/0262 |
| | | | 356/614 |
| 2015/0356030 A1 | 12/2015 | Zahand | |
| 2016/0087692 A1* | 3/2016 | Shimomura | A63F 13/34 |
| | | | 340/10.1 |
| 2016/0341418 A1 | 11/2016 | Leegate | |
| 2016/0341817 A1 | 11/2016 | Chen | |
| 2017/0196771 A1* | 7/2017 | Hooven | G16H 40/67 |
| 2018/0165906 A1* | 6/2018 | Phillips | G07D 7/12 |
| 2018/0206177 A1* | 7/2018 | Daoura | H04W 4/80 |
| 2018/0276428 A1* | 9/2018 | Kakani | G06Q 10/087 |
| 2019/0035569 A1* | 1/2019 | Sadwick | H05B 45/20 |
| 2019/0192380 A1* | 6/2019 | Tomlinson | A61H 31/007 |
| 2020/0102715 A1 | 4/2020 | Walliman | |
| 2020/0214625 A1* | 7/2020 | Hooven | A61B 5/002 |
| 2020/0368451 A1 | 11/2020 | Franke | |
| 2021/0033729 A1 | 2/2021 | Alalusi | |
| 2021/0145508 A1* | 5/2021 | Honegger | A61B 17/320092 |
| 2021/0212695 A1 | 7/2021 | Sugirthamuthu | |
| 2021/0386124 A1* | 12/2021 | Antonopoulos | A24F 15/01 |
| 2022/0013316 A1 | 1/2022 | Zhong | |
| 2022/0155417 A1 | 5/2022 | Kume | |
| 2022/0283270 A1 | 9/2022 | Lee | |
| 2023/0081713 A1* | 3/2023 | Zhijian | G01S 7/4813 |
| | | | 356/614 |
| 2024/0096196 A1* | 3/2024 | Zhijian | G08B 3/1083 |

* cited by examiner

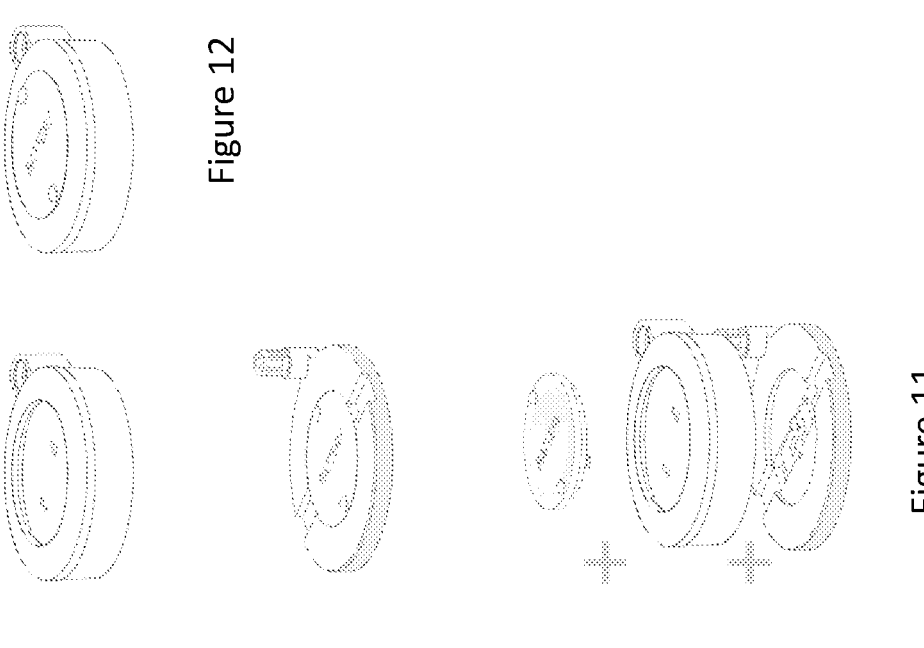
Figure 12
Figure 11
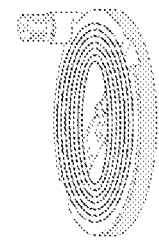
Figure 10

2500

2600

2800

3100

3200

POSITION LOCATOR

TECHNOLOGY FIELD

The utility model relates to the field of locating equipment, in particular, a new type of position locator.

BACKGROUND TECHNOLOGY

Locator is a device used for location positioning and tracking. In mountaineering, camping and other outdoor activities, people generally like to hang a locator on the backpack.

The existing locator mainly includes shell, main board, buzzer and battery, battery through the positive electrode shrapnel and cathode shrapnel connected to the main board and supply power for it, as shown in FIG. 1, although the existing positive and cathode shrapnel has elasticity, able to pre-tighten the battery, but there is no anti-detachable structure function, in the process of use is likely to break contact, which can not be used normally. And the existing positive electrode shrapnel using manual welding, the process is set at the bottom of the two pins "a" through the two holes in the main board for positioning, and then by hand welding two pins "a" to make it fixed with the main board, due to the pins "a" through the holes will have up and down position deviation, making the height of the shrapnel position is not fixed, the consistency is poor, so it is possible that shrapnel can not be normal contact with the button battery.

Utility Model Content

The purpose of the utility model is to overcome the above shortcomings to provide a new type of position locator for solving the problem of poor consistency between the high and low positions of positive and cathode shrapnel and can achieve automatic installation of shrapnel.

The utility model is realized through the following technical solutions: a new type of position locator, comprising a shell, wherein the shell is set with a main board, battery, positive electrode shrapnel, cathode shrapnel and light source, wherein the button battery through the positive electrode shrapnel and cathode shrapnel connected to the main board and supply power for it, wherein the shell is provided with a light-transmitting window, light of the light source is projected outward through the light-transmitting window, wherein the light source is generally set substantially in the middle of one side of the main board and controlled by the main board, wherein the battery is generally set in the substantially middle of the other side of the main board.

Wherein the shell is provided with a concave battery storage space outside for holding the battery, wherein the concave battery storage space separates the main board and the button battery.

Wherein the positive electrode shrapnel and cathode shrapnel comprises solder pads and contacts set on the solder pads, the bottom of the solder pads are provided with a reference surface parallel to the main board, wherein the cathode shrapnel is located at the bottom of the battery and near the outer edge, the positive electrode shrapnel is located on the outer edge of the button battery, the positive electrode shrapnel and cathode shrapnel through the reference surface of the respective solder pads fixed on the upper surface of the main board and connected to the button battery through the respective contacts.

Further, wherein the solder pad has an area of at least 8 mm².

Further, the number of contacts of the positive electrode shrapnel is at least one, the positive electrode shrapnel includes a first extension section connected to the solder pad and extending from the bottom to the top, a pretensioned section extending from the top to the bottom, and a flexible connection section connected between the first extension section and the pretensioned section, the pretensioned section is pushed against the outer edge of the battery and pretensions the battery together with the inner peripheral wall of the concave battery storage space, there is a deformation space reserved between said first extension section and the pretensioned section, the pretensioned section can be flexibly deformed in the deformation space driven by the flexible connection section so that the battery can be inserted, the pretensioned section has a fixed pretensioned state touching the first extension section, in the fixed pretensioned state, the pretensioned section is partially located on the upper surface of the battery to prevent the battery from being dislodged.

Further, the free end of the pretensioned section is further provided with a touching section extending close to the first extended section for reducing the deformation distance between the pretensioned section and the first extended section.

Further, the contact piece of the said cathode shrapnel includes a flexible extension section connected to the solder pad and inclined from the bottom to the top, and a second extension section connected to the flexible extension section and inclined from the top to the bottom, and the main board is provided with an upper and lower through-hole corresponding to the positive contact piece, and the connection part of the flexible extension section and the second extension section is located above the through-hole and flexibly connected to the bottom of the battery.

Further, wherein the new locator also includes a buzzer located below the main board, the buzzer is connected to the main board and controlled by it, the buzzer is provided with a light-transmitting hole, the shell is provided with a light-transmitting window, the light source light is projected outward through the light-transmitting hole and light-transmitting window in turn.

The second extension section is threaded downward to the bottom of the deformation hole and touches the top of the buzzer below to prevent the connection part of the flexible extension section and the second extension section from falling into the deformation hole.

Further, the bottom of solder pads are provided with downward extending set of positioning tabs, the positioning tabs and the corresponding positioning holes on the main board to facilitate the insert.

Further, the solder pads are fixed to the main board by the SMT process.

Further, wherein the positive electrode shrapnel and cathode shrapnel are manufactured from stainless steel material, and its surface is also provided with a gold plating layer.

Further, wherein the positive electrode shrapnel and negative electrode shrapnel are integrally bent and formed.

Further, the shell is also provided with a battery storage space cover on the concave battery storage space.

Compared with the prior art, the utility model has the following beneficial effects.

As the positive and cathode shrapnel is provided with a solder pad, the bottom of the solder pad is provided with a reference surface for positioning with the main board for high and low position, can ensure the consistency of the height of the shrapnel. And the contact area of the solder pad is large with good stability. And the solder pad area is large, can be adsorbed by mechanical equipment (such as suction cups), realizing automatic installation, such as the use of SMT process for installation.

ILLUSTRATION FOR FIGURES

FIGS. 10, 11, 12, 13, 14, 15, 16, 17, 18, 19, 20, 21, 22, 23, 24, 25, 26, 27, 28, 29, 30, 31 and 32 depict the present invention.

Figure 1:
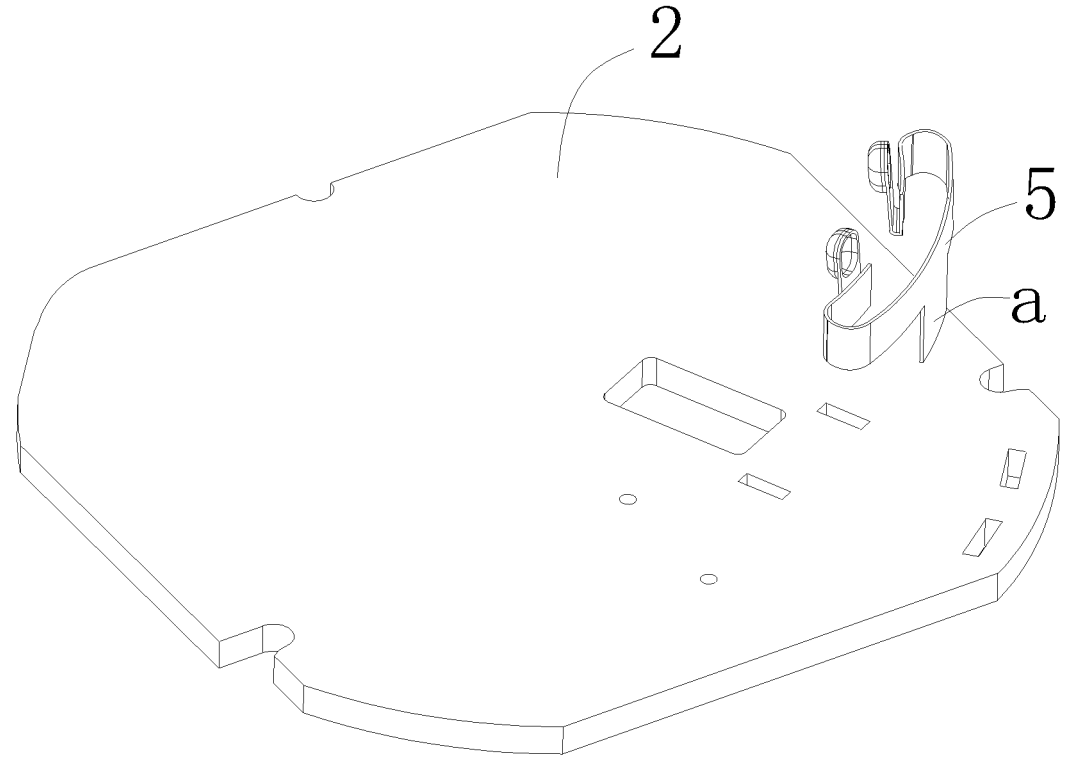
FIG. 1 is schematic diagram of the structure of an existing positive electrode shrapnel.

Marking description: 1 shell, 11 concave battery storage space, 12 light-transmitting window, 13 positive electrode shrapnel through-hole, 14 cathode shrapnel through-hole, 2 main board, 21 deformation through-hole, 3 buzzer, 31 light-transmitting hole, 4 battery, 5 positive electrode shrapnel poppet, 51 solder pad, 511 reference surface, 52 contact piece, 521 first extension section, 522 pre-tightening section, 523 flexible connection section, 524 touching section, 53 positioning piece, 6 cathode shrapnel, 61 solder pad, 611 reference surface, 62 contact piece, 621 flexible extension section, 622 second extension section, 63 positioning tab, 7 light emitting unit, 8 battery storage space cover, 9 material belt, 1010 base case, 1012 position locator, 1014 power contact, 1018 hardware, 1020 hardware lock, 1022 position locator, 1024 base case, 1026 position locator, 1028 base case, 1030 position locator, 1032 base case and 1034 hardware.

SPECIFIC IMPLEMENTATION

The utility model is described in detail below in conjunction with the accompanying illustrations.

This implementation example relates to a new type of locator for locating and finding, FIGS. 2-9 depict a shell 1, wherein the shell 1 is set with a main board 2, battery 4, positive electrode shrapnel 5, cathode shrapnel 6 and light source 7, the battery 4 is connected to the main board 2 through positive electrode shrapnel 5 and cathode shrapnel 6 and powered by it, the shell 1 is provided with a light-transmitting window 12, the light of the light source 7 projected outward through the light-transmitting window 12, wherein the light source 7 is generally set in the middle of one side of the main board 2 and controlled by the main board 2, the battery 4 is generally set in the middle of the other side of the main board 2.

Wherein the positive electrode shrapnel 5 and cathode shrapnel 6 comprises solder pads 51, 61 and contact 52, 62 set on the solder pads 51, 61, the bottom of the solder pads 51, 61 is provided with a reference surface 511, 612 parallel to the main board 2, wherein the cathode shrapnel 6 is located at the bottom of the battery 4 and near the outer edge, positive electrode shrapnel 5 is located on the outer edge of the battery 4, positive electrode shrapnel 5 and cathode shrapnel 6 through the reference surface of the respective solder pads fixed on the upper surface of the main board 2, and connected through the respective contact with the battery 4.

As the positive and cathode shrapnel are set with solder pads, the bottom of the solder pad with a reference surface for positioning with the main board for high and low position, can ensure the consistency of the height of the shrapnel. And the contact area of the solder pad is large with good stability. And the solder pad area is large, can be adsorbed by mechanical equipment such as suction cups, automated installation can be achieved, such as the use of SMT process for installation. Surface Mount Technology (SMT) is the method used to mount electrical components directly onto the surface of a PCB. This multi-step process begins with the stenciling solder paste. Think of it like screen-printing a t-shirt, only instead of ink, Qualitel uses a solder paste to print the paste, and then the pick and place machines place the parts on the board. After the PCB boards with components are mounted, they go through a reflow oven to melt the solder.

Figure 2:
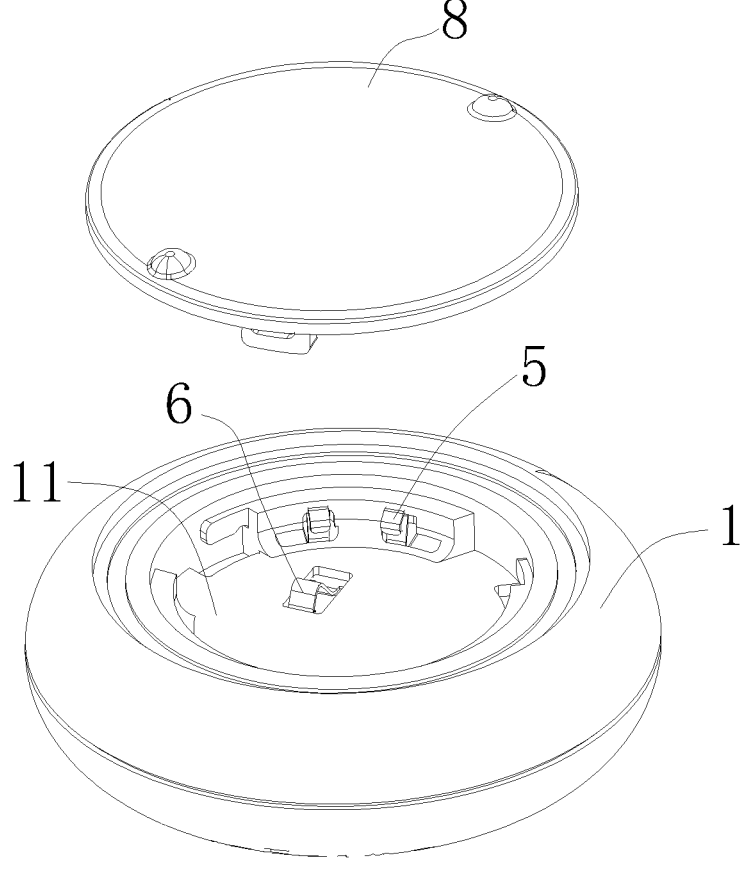
FIG. 2 is schematic diagram of the explosion I of the utility model.
Figure 3:
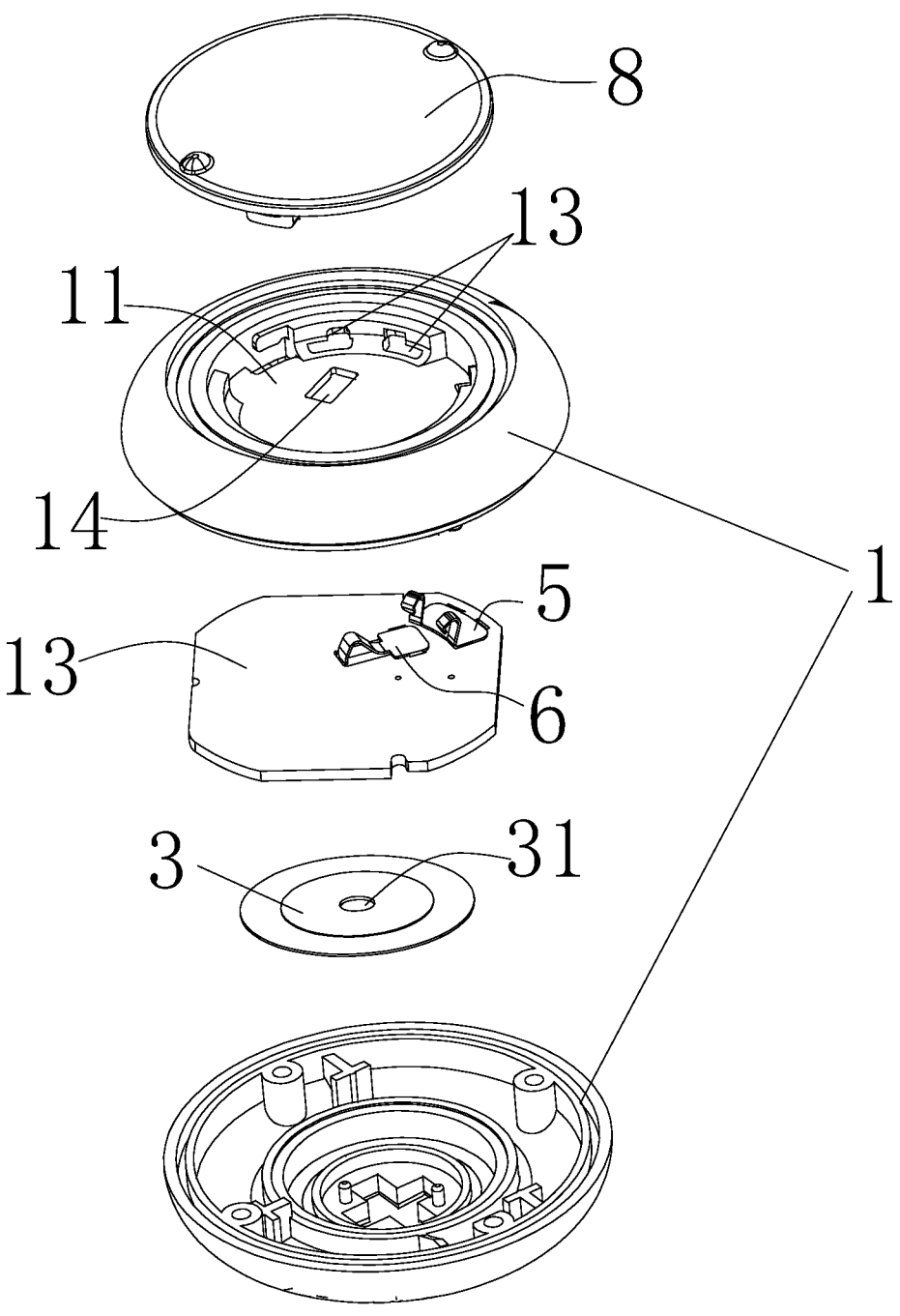
FIG. 3 is schematic diagram of the explosion II of the utility model.
Figure 4:
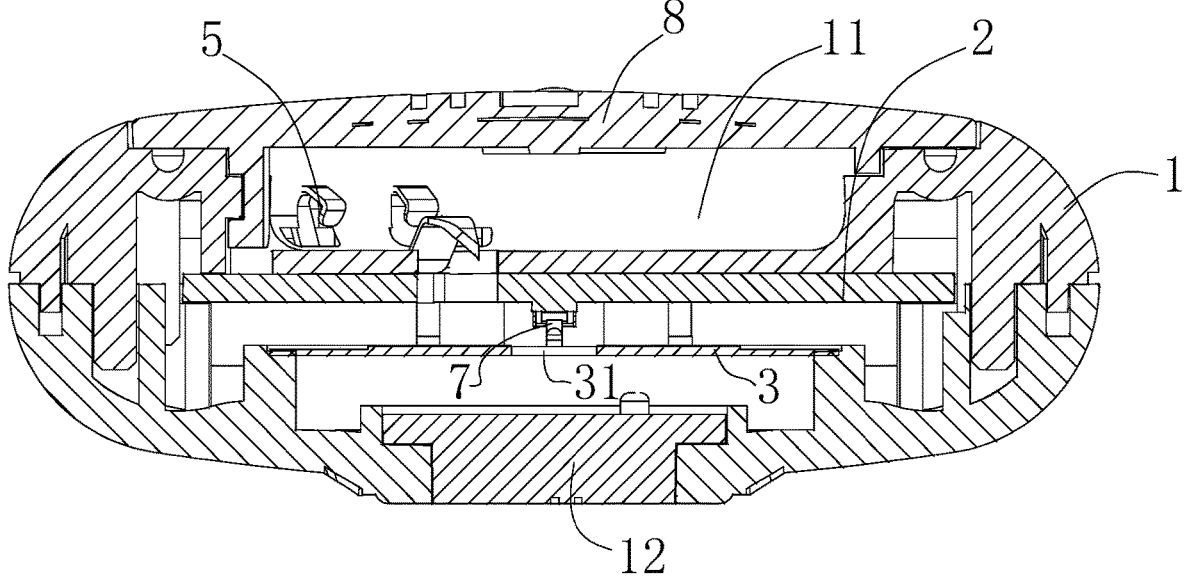
FIG. 4 is schematic diagram of the internal structure of the utility model.

As a further improvement, as shown in FIGS. 2-3, the exterior of the shell 1 is provided with a concave battery storage space 11 for holding the battery 4, the concave battery storage space 11 separates the main board 2 and the battery 4, where the concave battery storage space separates the main board 2 and the battery 4, which can avoid direct exposure and increase the lifespan of the main board.

Figure 9:
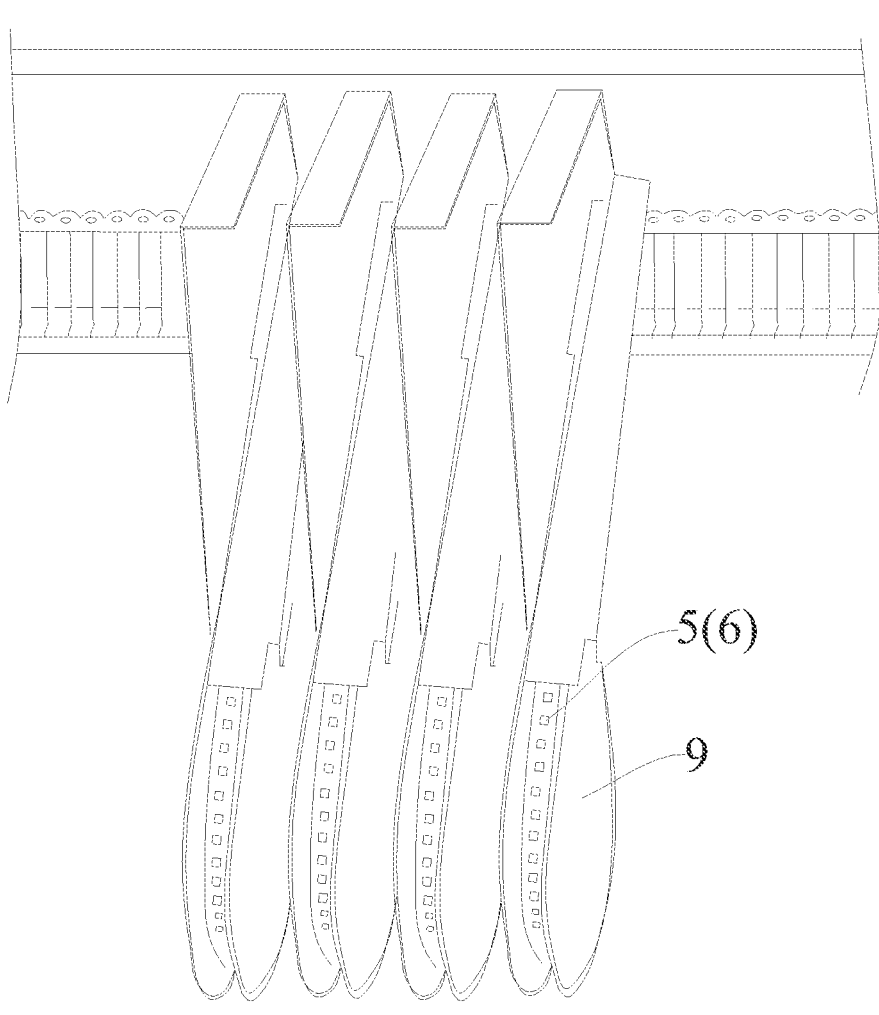
FIG. 9 is schematic diagram of the structure of the shrapnel loaded on the material belt in this utility model.
Figure 13:
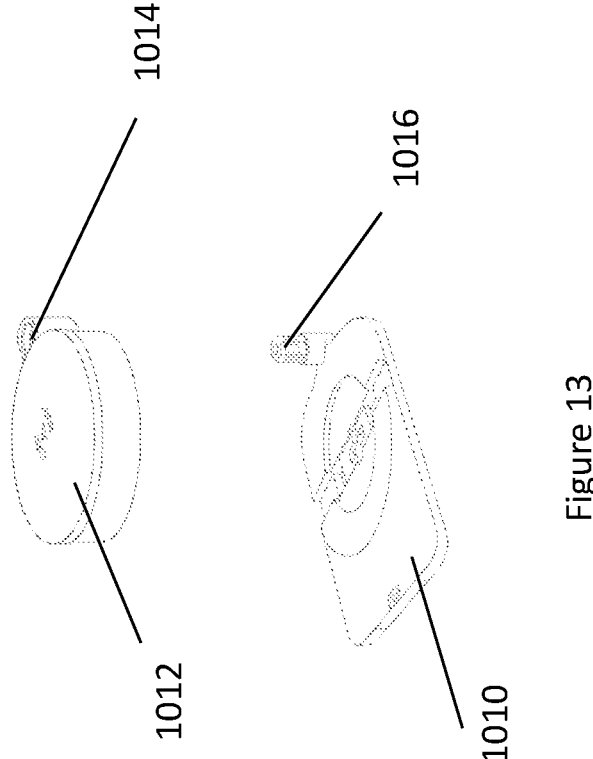
Figure 14:
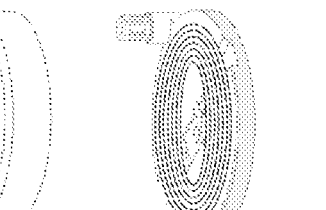
Figure 15:
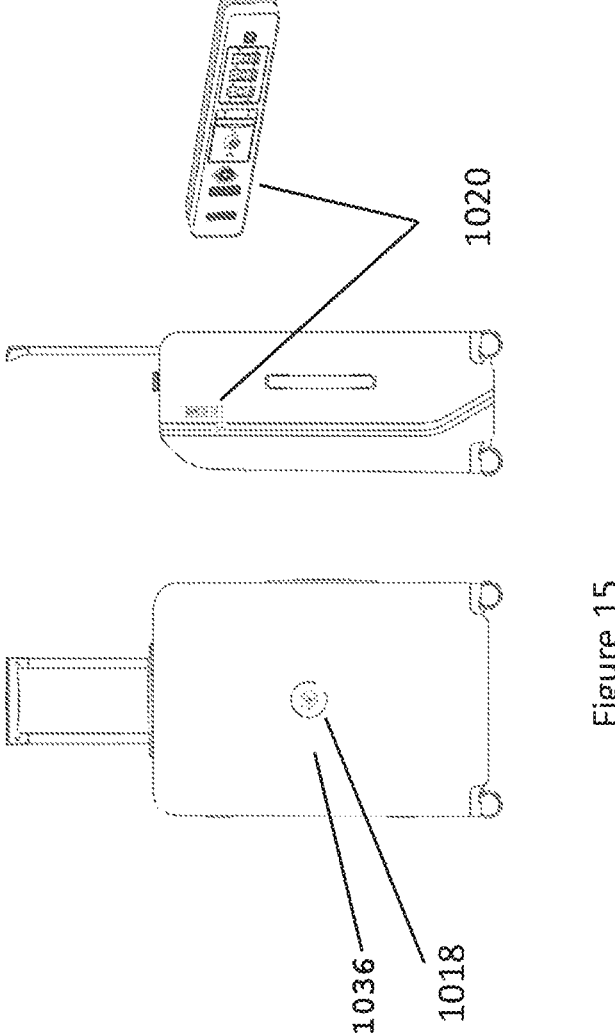
Figure 16:
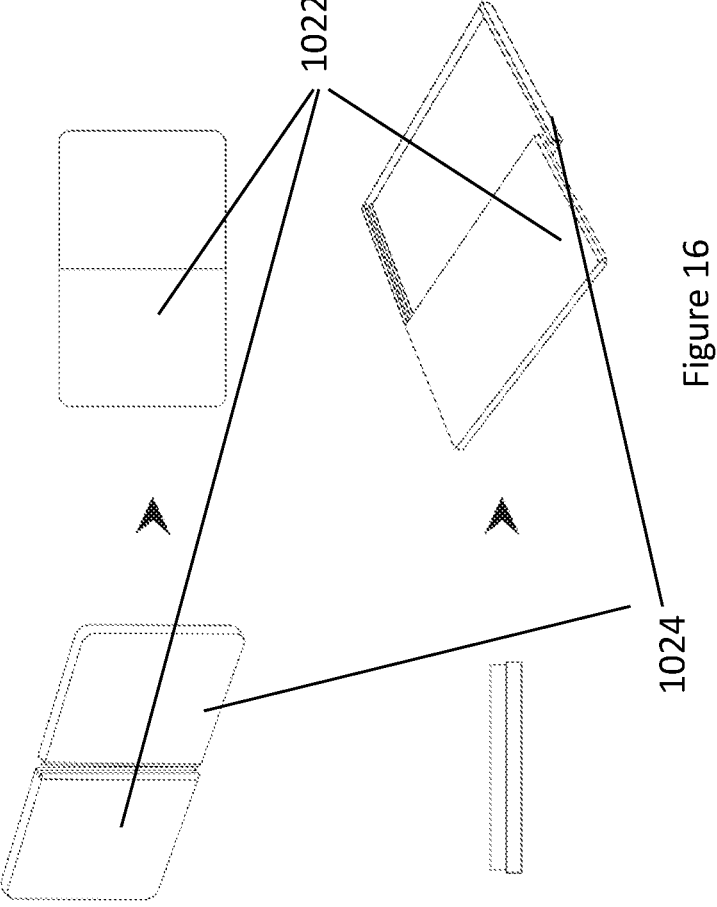
Figure 17:
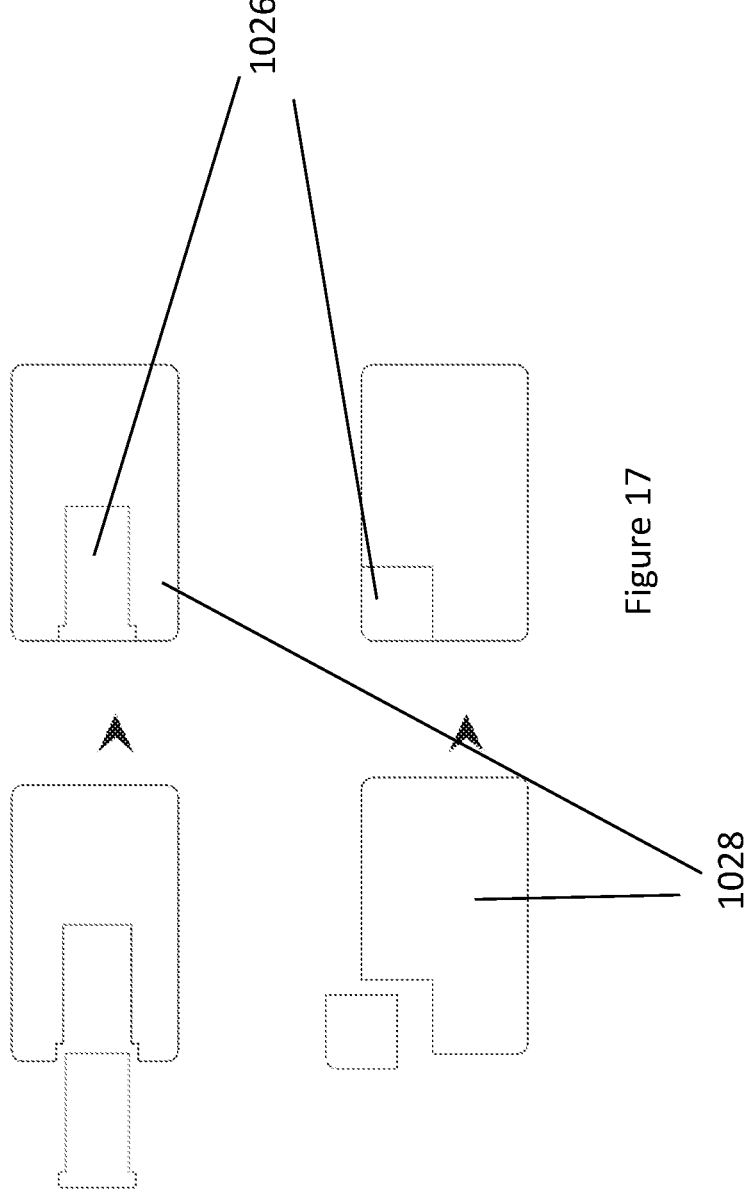
Figure 18:
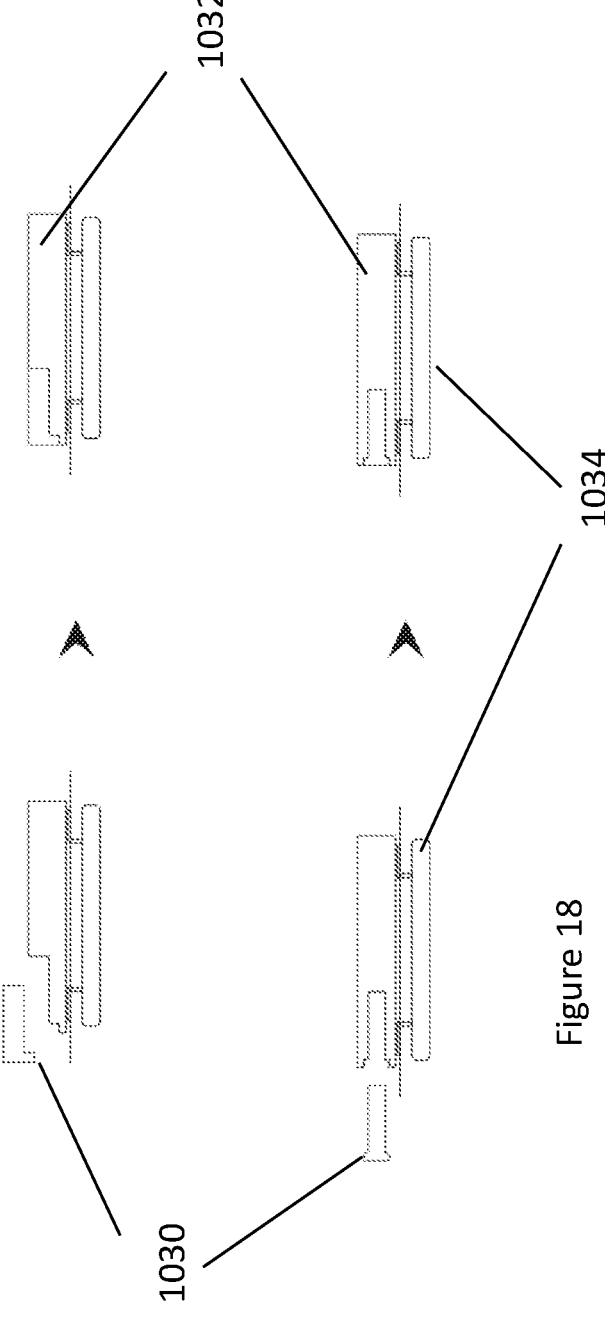
Figures 19, 20, 21, 22, 23, 24:
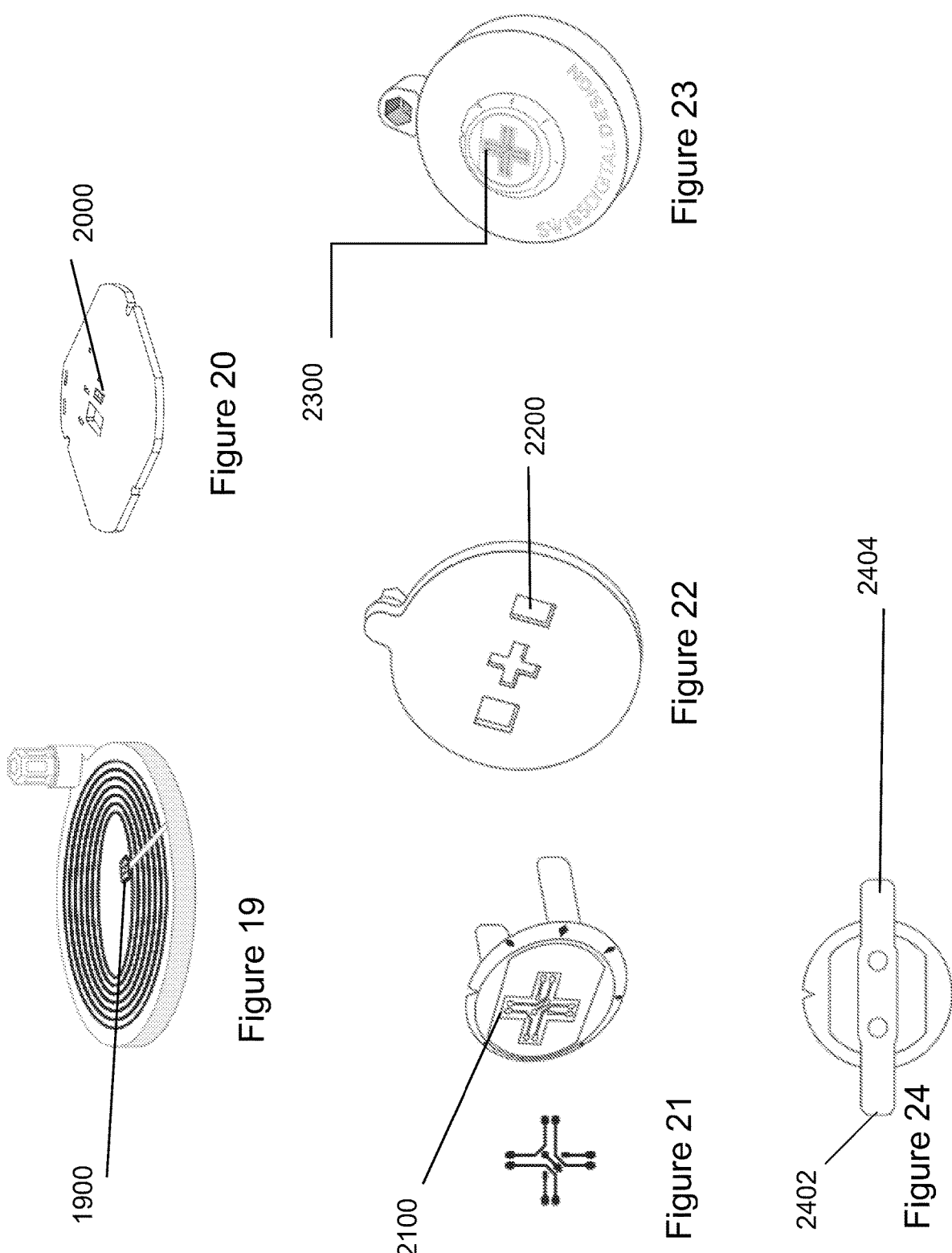
Figure 25:
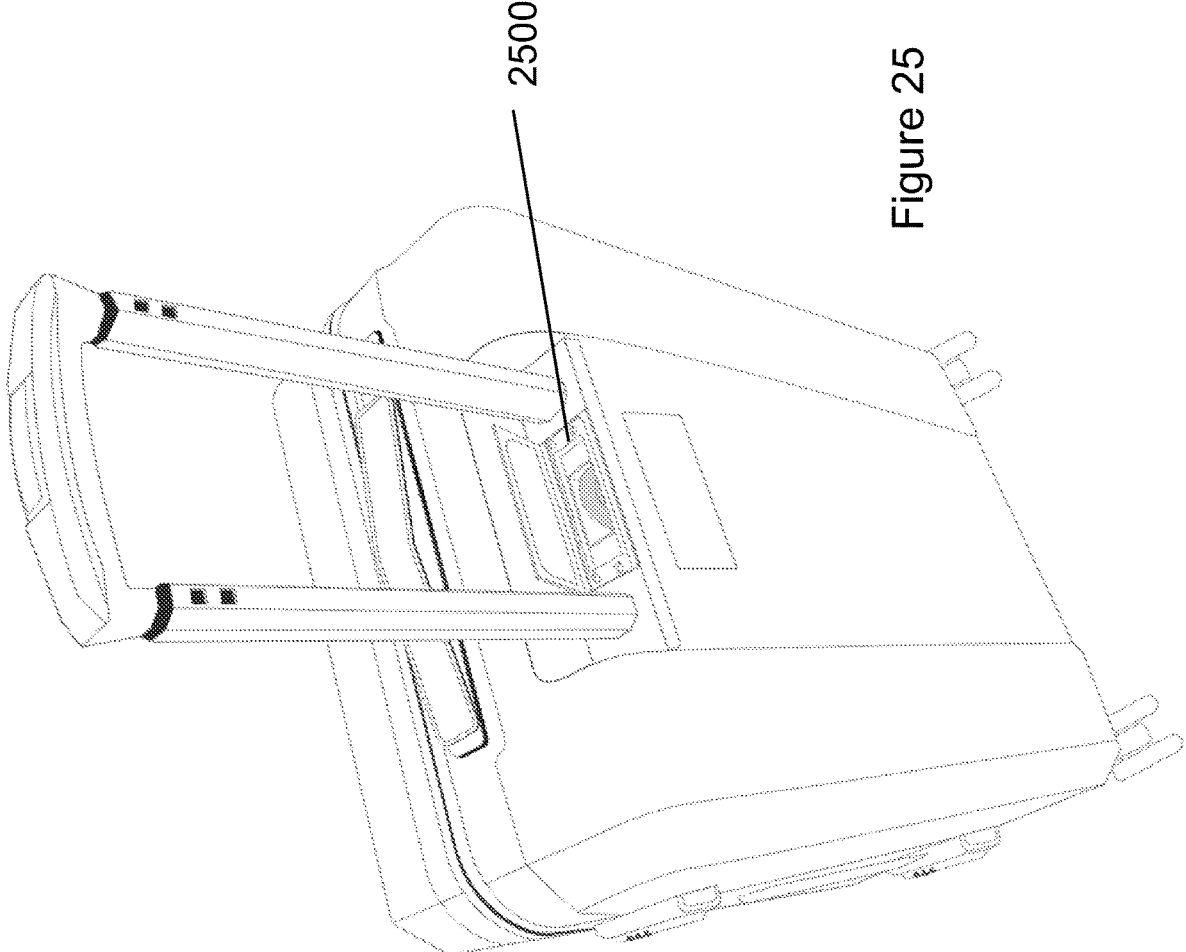
Figure 26:
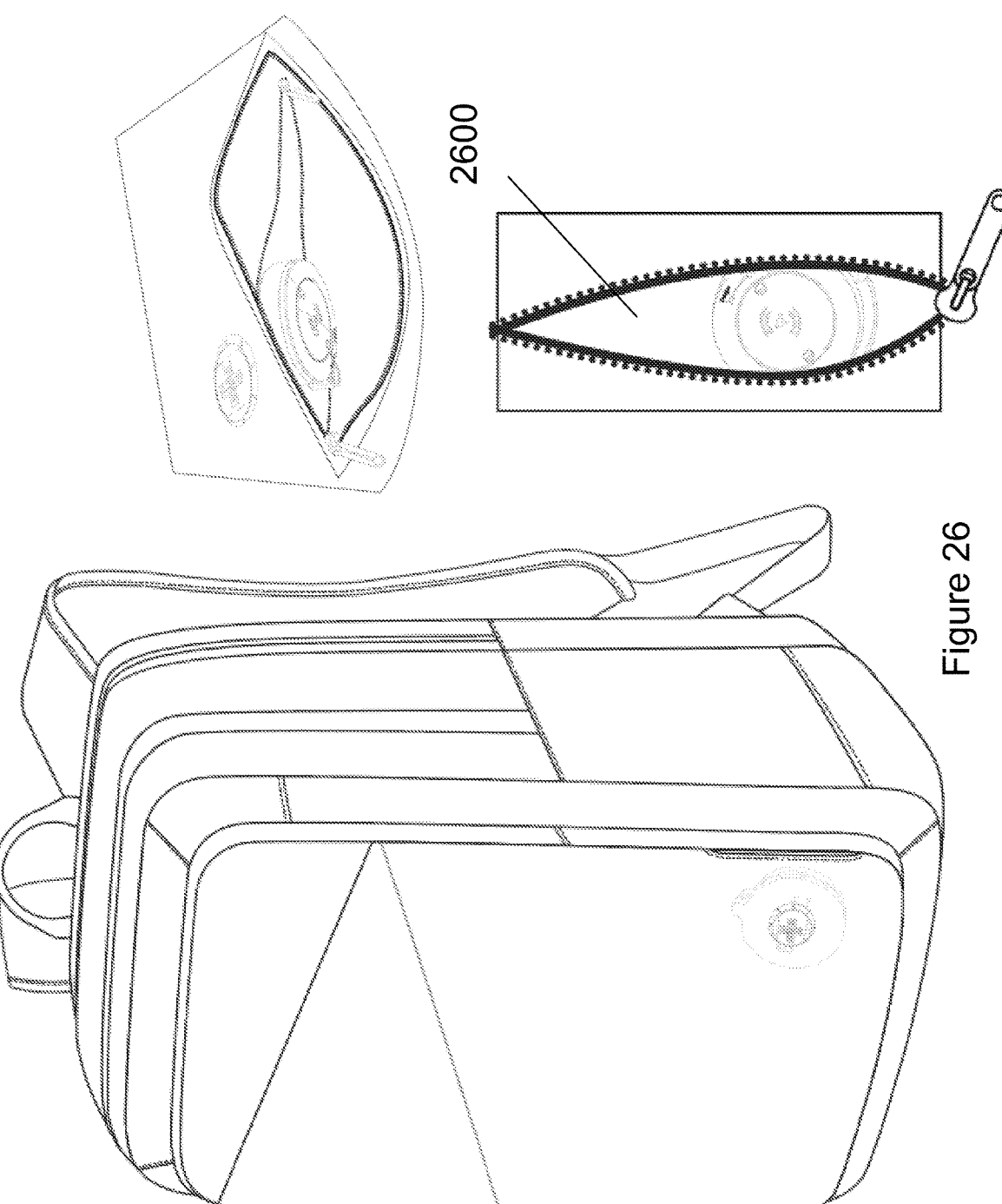
Figure 27:
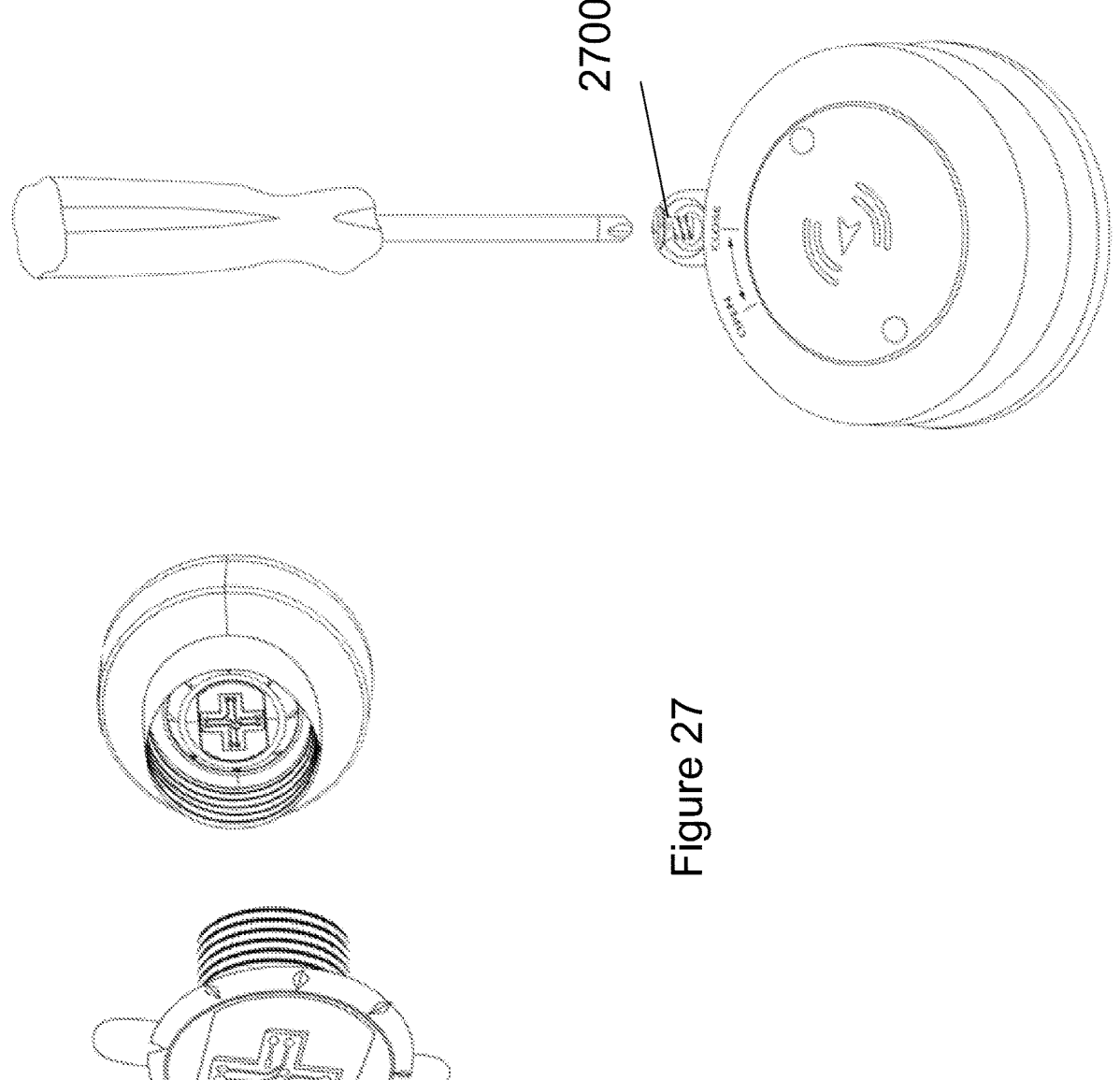
Figure 28:
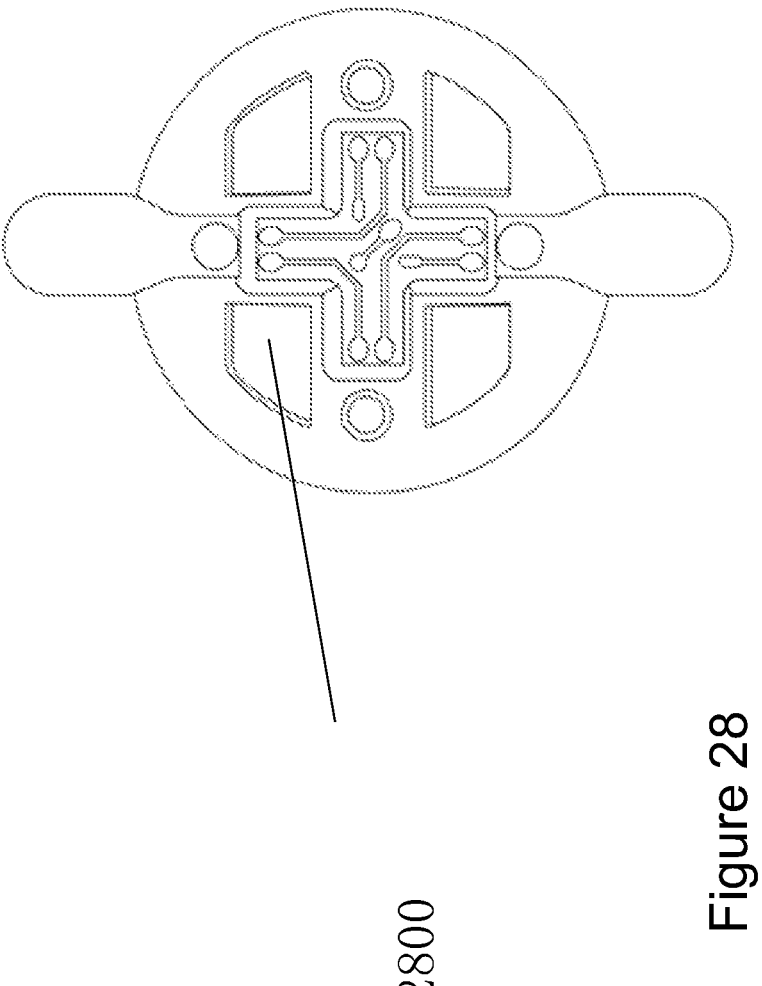

Preferably, the solder pads 51, 61 have an area of at least 8 mm², as shown in FIG. 9, which allows the shrapnel to be loaded on the material belt 9 so that the mechanical arm can absorb the shrapnel, thus realizing the automated installation of the shrapnel to the main board.

As a further improvement, as shown in FIGS. 5-8, the number of contacts 52 of the positive electrode shrapnel 5 is at least one, the positive electrode shrapnel 5 includes a first extension section 521 connected to the solder pad 51 and extending from the bottom to the top, a pretensioning section 522 extending from the top to the bottom, and an flexible connection section 523 connected between the first extension section 521 and the pretensioning section 522, said pretensioning section 522 is being pushed against the outer edge of the battery 4 and pretensions the battery 4 together with the inner peripheral wall of the concave battery storage space 11, and a deformation space is reserved between the first extension section 521 and the pretensioning section 522, and the pretensioning section 522 is flexibly deformable in the deformation space driven by the flexible connection section 523 for inserting the battery 4, and the pretensioning section 522 has a fixed pretensioning state where it touches the first extension section 521. In the fixed pre-tightened state, the pre-tightened segment 522 is partially located on the upper surface of the battery 4 to prevent the battery 4 from being dislodged.

As the positive contact piece of positive electrode shrapnel consists of the first extension section 621, pretensioned section 622 and flexible connection section 623, the pretensioned section 622 can be flexibly changed to facilitate the installation of the battery, and the pretensioned end 622 can be in contact with the first extension section 621 at the top to form an anti-disengagement structure to prevent the battery from disengaging and avoid broken contacts.

Figure 6:
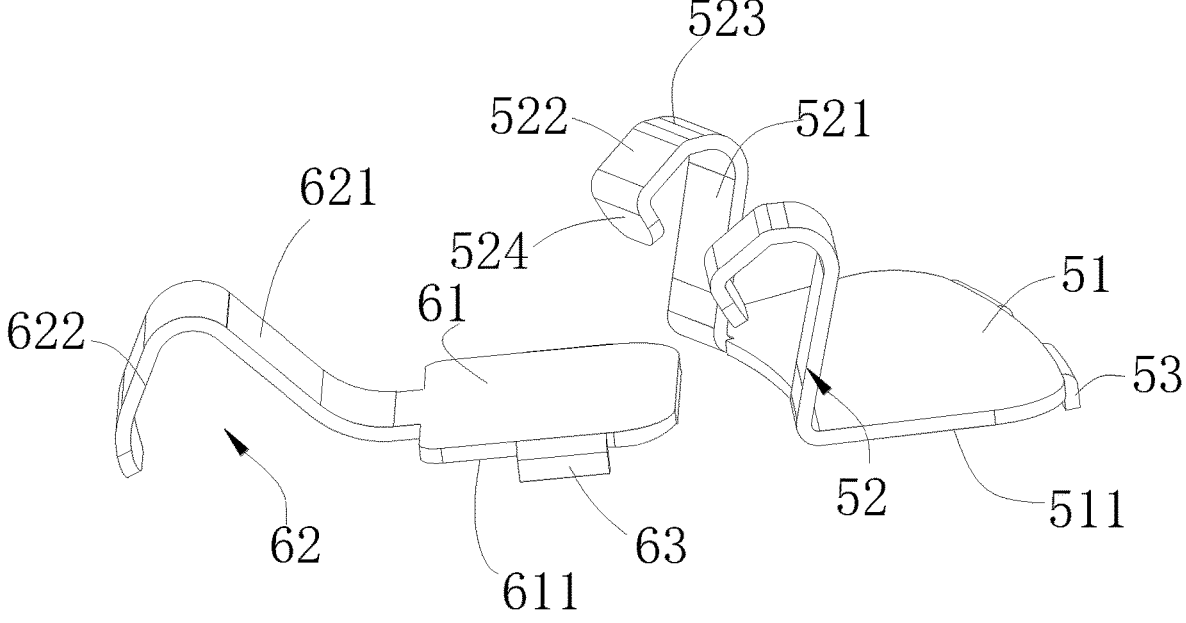
FIG. 6 is schematic diagram of the structure of the positive electrode shrapnel and the cathode shrapnel in this utility model.
Figure 7:
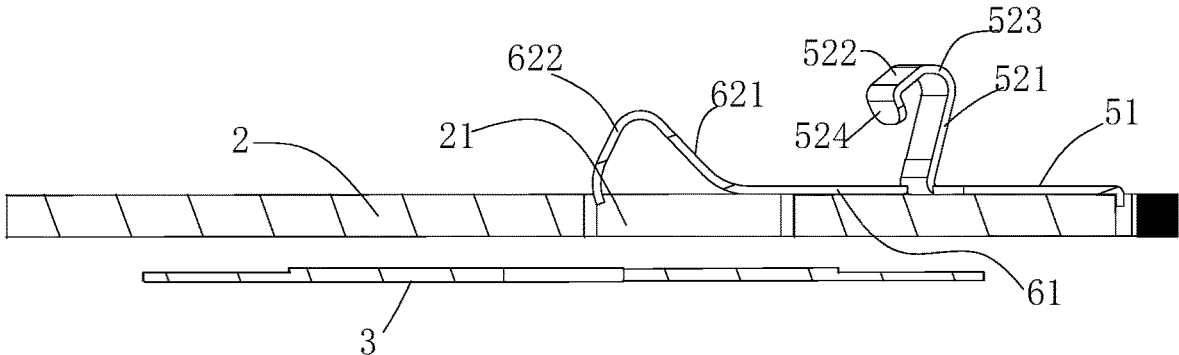
FIG. 7 is schematic diagram I of the utility model in use.
Figure 8:
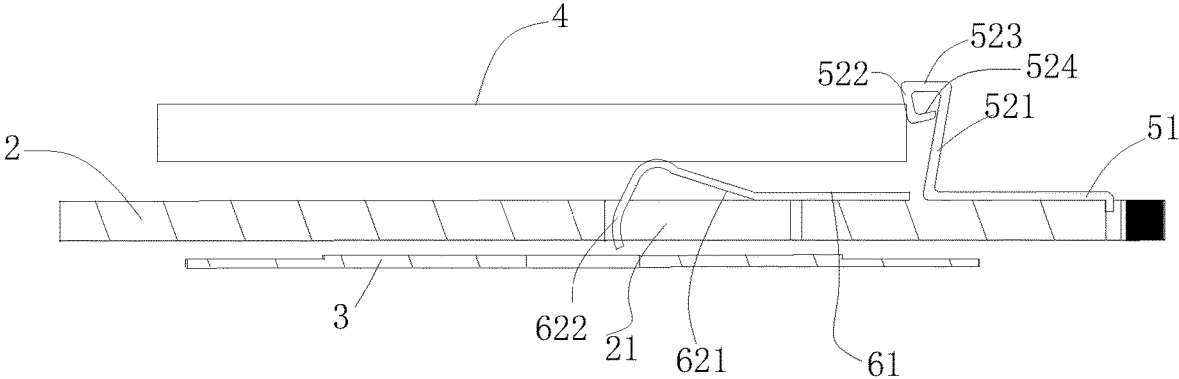
FIG. 8 is schematic diagram II of the utility model in use.

As a further improvement, as shown in FIGS. 6-8, the free end of the pretensioning section 522 is further provided with a touching section 524 extending and set in the direction close to the first extension section 521 for shortening the deformation distance between the pretensioning section 522 and the first extension section 521.

As a further improvement, as shown in FIGS. 5-8, the contact piece 62 of the cathode shrapnel 6 includes a flexible extension section 621 connected to the solder pad 61 and inclined from the bottom to the top, and a second extension section 622 connected to the flexible extension section 621 and inclined from the top to the bottom, and the main board 2 is provided with upper and lower through holes 21 corresponding to the positive contact piece 62, and the connection part of the flexible extension section 621 and the second extension section 622 is located above the through holes 21 and resiliently connected to the bottom of the battery 4.

Wherein the main board 2 is provided with deformation through holes 21 for partially accommodating cathode shrapnel 6 can reduce the thickness of the main board, thereby reducing the thickness and size of the locator, so that the locator is smaller and more delicate, convenient for the user to put it on any small box.

As a further improvement, as shown in FIGS. 3-8, wherein the new type of position locator also includes a buzzer 3 located below the main board 2, the buzzer 3 is connected to the main board 2 and controlled by it, the buzzer 3 is provided with a light-transmitting hole 31, the shell 1 is provided with a light-transmitting window 12, the light source 7 light is projected outward through the light-transmitting hole 31 and light-transmitting window 12 in turn.

Wherein the second extension section 622 is threaded from above to below the deformation through-hole 21 and touches the top of the buzzer 3 below to prevent the connection part of the flexible extension section 621 and the second extension section 622 from falling into the deformation through-hole 21.

Since the second extension 622 can move flexibly in the deformation through-hole 21, thus pressing on top of the buzzer to prevent the contact between the cathode shrapnel 6 and the battery 4 from falling into the deformation through-hole and thus not being able to connect the battery. Moreover, the locator provides both light and sound signals with strong positioning capability.

As shown in FIG. 3, wherein the positive electrode shrapnel extends into the concave battery storage space 11 through the positive electrode shrapnel through-hole 13 and the cathode shrapnel extends into the concave battery storage space 11 through the cathode shrapnel through-hole 14.

Figure 5:
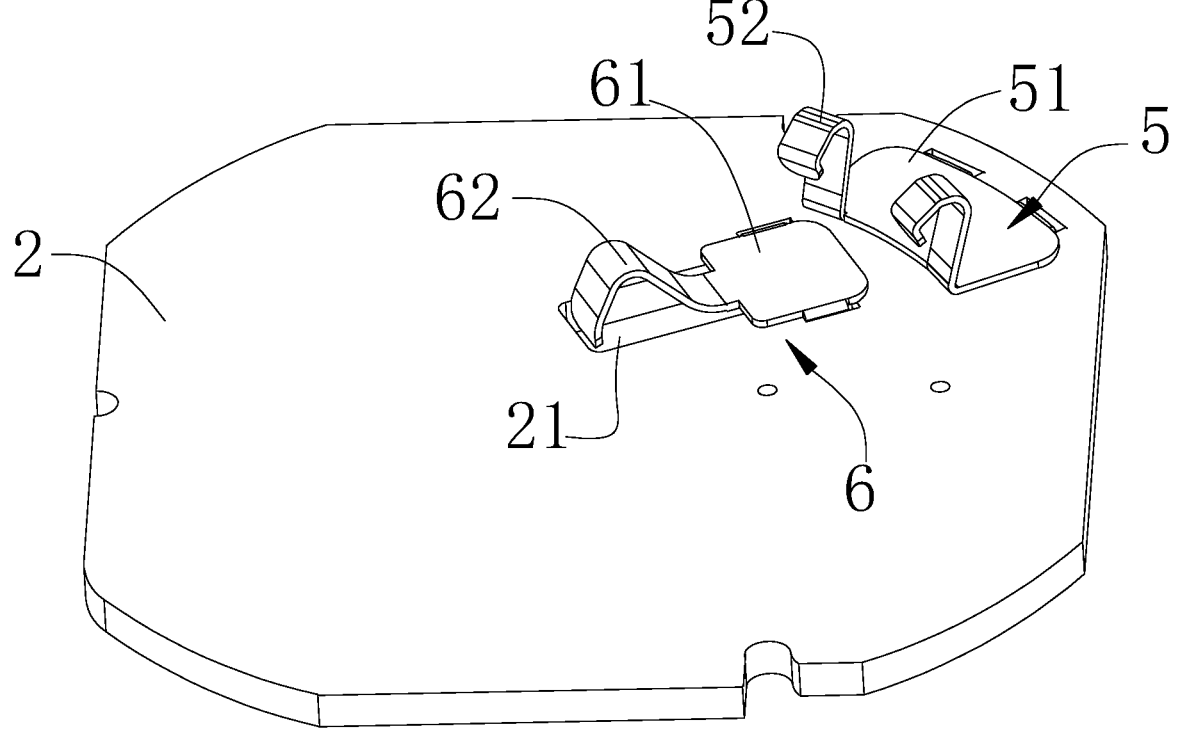
FIG. 5 is schematic diagram of the connection between the positive electrode shrapnel, cathode shrapnel and the main board in this utility model.

In order to facilitate the positioning installation of positive and cathode shrapnel, as shown in FIGS. 5-6, the bottom of the solder pads 51,61 are provided with downward extending set of positioning tabs 53,63, the positioning tabs 53,63 and the corresponding positioning holes on the main board 2 to facilitate the insert.

As a further improvement, the solder pads 51,61 fixed on the main board 2 through the SMT process. Specific patching process is: smear the main board with the solder paste, followed by positive and cathode shrapnel adsorption by suction cup, shift to a predetermined station, and attached through the pad in a predetermined location, and finally the parts will be sent into the reflow soldering over tin furnace, so that the solder paste will be melted and welded automatically after preheating, heating, reflow, cooling. Compared with the traditional manual welding process, it can greatly improve the production efficiency and product quality.

As a further improvement, wherein the positive electrode shrapnel 5 and cathode shrapnel 6 are manufactured from stainless steel material and have a gold plating layer on their surface. The shrapnel is gold plated to produce stronger electrical conductivity and toughness, and more elastic.

In order to facilitate manufacturing molding, the positive electrode shrapnel 5 and cathode shrapnel 6 are integrally bent and formed in one piece. Further, the shell 1 is further provided with a battery storage space cover 8 on the concave battery storage space 11.

With reference to the claims, a new type of position locator is disclosed, comprising a shell (1), wherein the shell (1) is provided with a main board (2), a battery (4), a positive electrode shrapnel (5), a cathode shrapnel (6) and light source (7), wherein the battery (4) through the positive electrode shrapnel (5) and cathode shrapnel (6) connected to the main board (2) to supply power for it, wherein the shell (1) is provided with a light-transmitting window (12), the light from light source (7) is projected outward through the light-transmitting window (12), wherein, the light source (7) is set on one side of the main board (2), and positioned on the substantially middle position of the main board and controlled by the main board (2), wherein the battery (4) is set on the other side of the main board (2), which positioned on the substantially middle position of the main board, wherein the shell (1) is provided with a concave battery storage space (11) on the outside for accommodating the battery (4), wherein the concave battery storage space (11) separating the main board (2) and the battery (4), wherein the positive electrode shrapnel (5) and cathode shrapnel (6) both comprising solder pads (51,61) and contacts (52,62) set on the solder pads (51,61), the bottom of the solder pads (51,61) being provided with reference surfaces (511, 612) substantially parallel to the main board (2), wherein the cathode shrapnel (6) being located at the bottom of the battery (4) and near the outer edge, the positive electrode shrapnel (5) being located at the outer edge of battery (4), positive electrode shrapnel (5) and cathode shrapnel (6) through the respective solder pads of the reference surface fixed on the upper surface of the main board (2), and through the respective contacts with the battery (4). The area of solder pads (51,61) may be at least 8 mm². The number of contacts (52) of the positive electrode shrapnel (5) is at least one, the positive electrode shrapnel (5) includes a first extension section (521) connected to the solder pad (51) and extending from the bottom to the top, a pretensioning section (522) extending from the top to the bottom, and a flexible connection section (523) connected between the first extension section (521) and the pretensioning section (522), wherein the pretensioning section (522) is pushed against the outer edge of the battery (4) and pretensions the battery (4) together with the inner peripheral wall of the concave battery storage space (11), wherein the first extension section (521) and pretensioning section (522) have a deformation space reserved between them, wherein the pretensioning section (522) can be flexibly deformed in the deformation space driven by the flexible connection section (523), wherein the pretensioning section (522) has a fixed pretensioning state touching the first extension section (521), in the fixed pretensioning state, the pretensioning section (522) is partially located on the upper surface of the battery (4). The free end of the pretensioned section (522) may be further provided with a touching section (524) extending in the direction of the first extension section (521) for reducing the deformation distance between the pretensioned section (522) and the first extension section (521). A contact piece (62) of the cathode shrapnel (6) may include a flexible extension (621) connected to the solder pad (61) and inclined from the bottom to the top, a second extension section (622) connected to the flexible extension section (621) and inclined from the top to the bottom, wherein the main board (2) is provided with an upper and lower through-hole (21) corresponding to the positive contact piece (62), the connection part of the flexible extension section (621) and the second extension section (622) is located above the through-hole (21) and the battery (62), the main board (2) is provided with upper and lower through holes (21) corresponding to the positive contact (62), and the connection part of the flexible extension section (621) and the second extension section (622) is located above the through holes (21) and the bottom of the battery (4) is flexibly connected. The new locator may also include a buzzer (3) located below the main board (2), wherein the buzzer (3) is connected to and controlled by the main board (2), wherein the buzzer (3) is provided with a light-transmitting hole (31), the light of the light source (7) is projected outward through the light-transmitting hole (31) and the light-transmitting window (12) in turn, wherein the second extension section (622) is threaded from top to bottom to the bottom of the deformation through-hole (21) and touches the top of the buzzer (3) below to prevent the connection part of the flexible extension section (621) and the second extension section (622) from falling into the deformation through-hole (21). The bottom of the solder pads (51,61) may be provided with downward extending set of positioning pieces (53,63), wherein the positioning pieces (53,63) and the corresponding locating holes on the main board (2) to fit the insert. The solder pads (51,61) may be fixed to the main board (2) by a SMT process. The positive electrode shrapnel (5) and cathode shrapnel (6) may be manufactured from stainless steel material, and its surface may also provided with a gold-plated layer. The positive electrode shrapnel (5) and cathode shrapnel (6) may be integrally bent and formed. The shell (1) may be further provided with a battery storage space cover (8) on the concave battery storage space (11).

As depicted in FIGS. 10, 11, 12, 13, 14, 15, 16, 17 and 18 a multifunctional position locator is provided with a body (1036), a hardware piece (1018) attached to the body (1036), a base case (1010, 1024, 1028, 1032) removably attached to the hardware, wherein the base case has at least one power contact (1016), a position locator (1012, 1022, 1026, 1030) removably attached to the base case and having at least one position locator power contact (1014), wherein the base case has an NFC sensor (1900), wherein the position locator has at least one light-transmitting through-hole (2300) provided with a light source (2000) inside of the position locator and light from the light source is projected outward through at least one of the light-transmitting through-holes (2300), wherein the hardware has a hardware opening (2100) and the position of the light-transmitting through-hole is matched with hardware opening, to allow the light projected outward, when the position locator is fixed on the hardware, wherein the body has a body opening that is at least the same size or larger than the hardware light-transmitting through-hole and the body opening is substantially aligned with the hardware opening and the light-transmitting channel when the hardware is attached to the body.

The hardware is selecting from a group of a brand logo, a lock (1020), a handle, a pull rod middle plate (2500). The hardware has at least two folding feet (2402, 2404) and the body has at least two holes (3000, 3002. 3100) to allow the folding feet to pierce through to receive the hardware attached on it. The hardware may have a recess (2800) to receive the base case. The base case may have at least two holes (2200), which allow the folding feet on the hardware to be pierced through and fixed on the back of the hardware. The position locator may be removably fixed to the base case by a screw (2700). The position locator may be removably fixed to the hardware by a fast clip (2900, 2902, 2904, 2906 and 2908). The light-transmitting through-hole may also be an audible through-hole (3200). The position locator may be fixed on the inner side of the body inside of a pocket (2600). The pocket may have an opening with a size of at least 20 mm to allow user to easily remove or attach the position locator.

The hardware may be fixed on the body by glue. The body may be fabric, and the edge of the opening be coated by heating cut or glue or surrounding stitching, so that the fabric is not easy to spread and damaged.

A multifunctional position locator, comprising, a body, a hardware attached to the body, a base case, wherein the base case is removably attached to the hardware and having at least one power contact, a position locator removably attached to the base case and the position locator having at least one position locator power contact, and at least one battery, wherein the base case has an NFC sensor with no battery, when the position locator is attached to the base, the position locator supplies power through the power contact on the base and the position locator power contact, activating the NFC function on the base.

Figure 29:
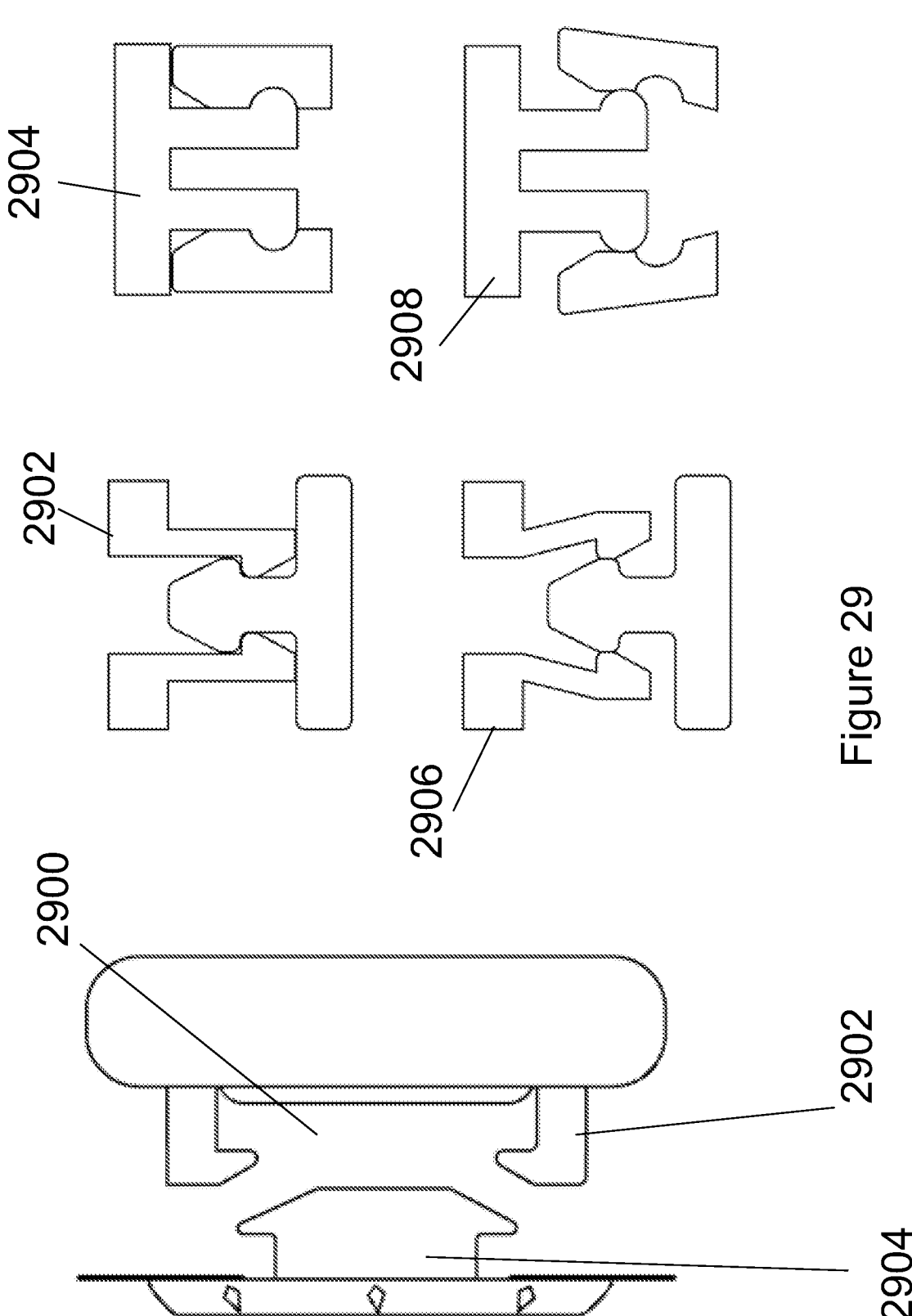
Figure 30:
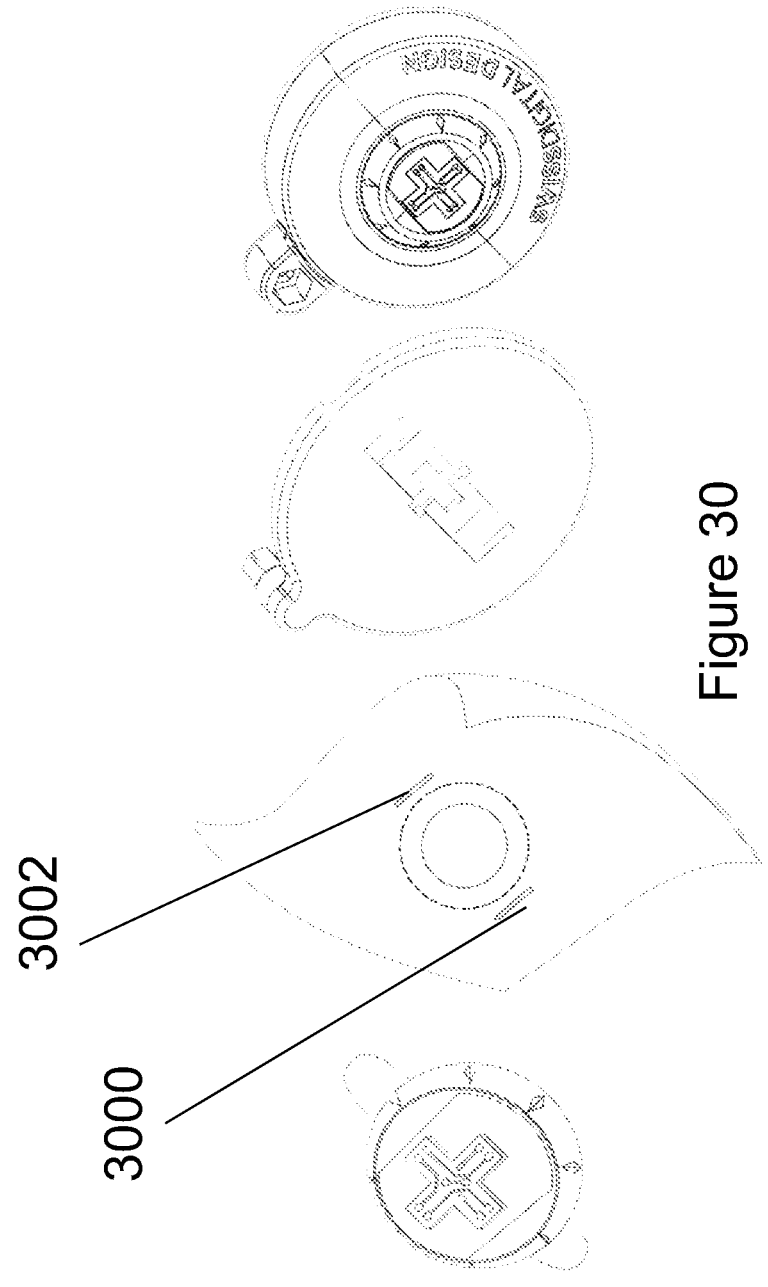
Figure 31:
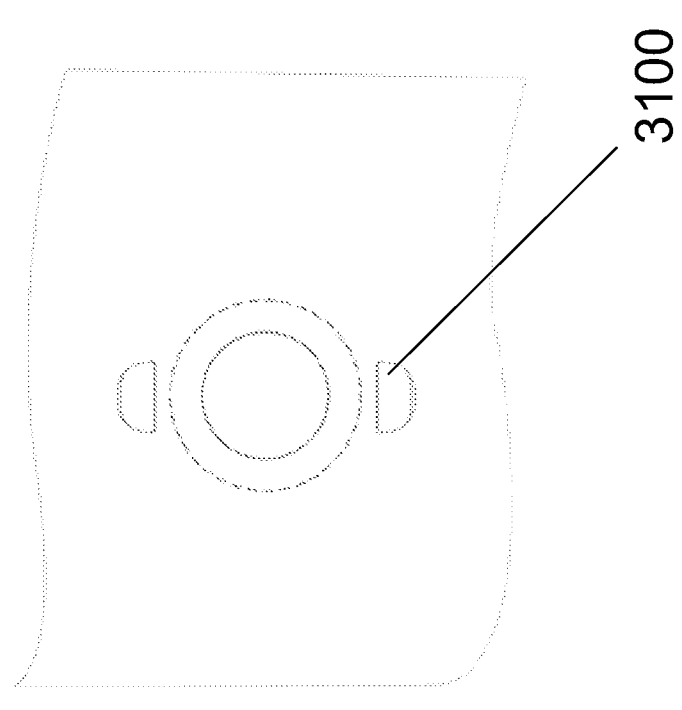
Figure 32:
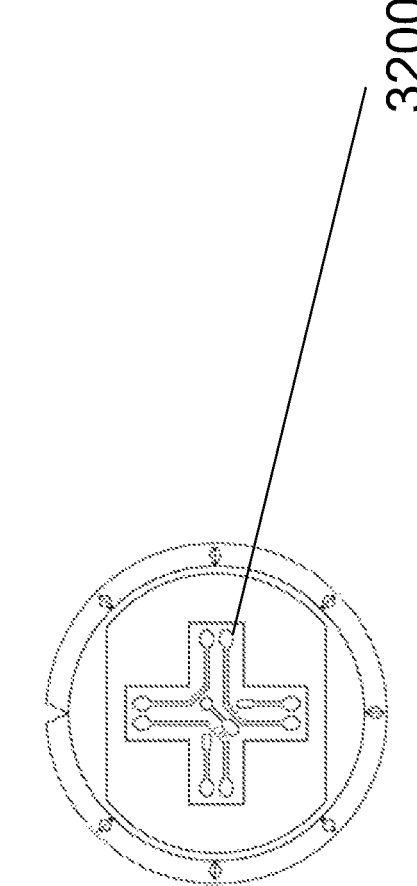

The hardware may be a brand logo, a lock, a handle, a pull rod middle plate. The hardware may have at least two folding feet, wherein the body has at least two holes to allow the folding feet to pierce through to receive the hardware attached on it. The hardware may have a recess (2800) to receive the base case. The base case may have at least two holes, which allow the folding feet on the hardware to pierce through and to be fixed on the back of the hardware. The position locator may be removably fixed to the base case by a screw. The position locator may be removably fixed to the hardware by a fast clip (2900). As shown in FIG. 29, a fast clip (2900) typically has a female portion (2902) and a male portion (2904) that allows for easy and quick connection of the parts.

Although the utility model is illustrated and described using specific implementation examples and alternatives thereto, it should be understood that variations and modifications may be implemented as long as they do not depart from the spirit of the utility model. Therefore, it should be understood that the utility model is not limited in any sense except by the accompanying claims and their equivalents.

The invention claimed is:

1. A multifunctional position locator, comprising,
a body,
a hardware piece attached to the body,
a base case removably attached to the hardware piece,
wherein the base case has at least one power contact,
a position locator removably attached to the base case and having at least one position locator power contact,
wherein the base case has an NFC sensor,
wherein the position locator has at least one light-transmitting through-hole and is provided with a light source inside of the position locator and light from the light source is projected outward through the at least one light-transmitting through-hole,
wherein the hardware piece has a hardware opening and the position of the at least one light-transmitting through-hole of the position locator is matched with the hardware opening of the hardware piece to allow the light to be projected outward through the hardware opening when the position locator is fixed on the hardware piece, wherein the body has a body opening that is at least the same size or larger than the hardware opening and the body opening is directly aligned with both the hardware opening and the at least one light-transmitting through-hole of the position locator when the hardware is attached to the body;

wherein the hardware opening, the light-transmitting through-hole, and the body opening are directly aligned with each other to form a channel in the body to allow light to pass through the channel with no intervening structure between any of the hardware opening, the light-transmitting through-hole, and the body opening.

2. A multifunctional position locator as in claim 1, wherein the hardware piece is selected from a group of a brand logo, a lock, a handle, or a pull rod middle plate.

3. A multifunctional position locator as in claim 2, wherein the hardware piece has at least two folding feet and the body has at least two holes to allow the folding feet to pierce through to receive the hardware piece attached on it.

4. A multifunctional position locator as in claim 1, wherein the hardware piece has a recess to receive the base case.

5. A multifunctional position locator as in claim 1, wherein the base case further comprises at least two holes, which allow folding feet on the hardware piece to be pierced through so that the position locator is fixed on the back of the hardware piece.

6. A multifunctional position locator as in claim 1, wherein the position locator is removably fixed to the base case by a screw.

7. A multifunctional position locator as in claim 1, wherein the position locator is removably fixed to the hardware by a fast clip.

8. A multifunctional position locator as in claim 1, wherein the at least one light-transmitting through-hole is also an audible through-hole.

9. A multifunctional position locator as in claim 1, wherein the position locator is fixed on the inner side of the body inside of a pocket.

10. A multifunctional position locator as in claim 9, wherein the pocket has an opening with a size of at least 20 mm.

11. A multifunctional position locator as in claim 1, wherein the hardware piece is fixed on the body by glue.

12. A multifunctional position locator as in claim 1, wherein the body is fabric, and the edge of the body opening is coated by heating cut or glue or surrounding stitching.

13. A multifunctional position locator, comprising, a body, a hardware attached to the body, a base case, wherein the base case is removably attached to the hardware and having at least one base case power contact, a position locator removably attached to the base case, the position locator having at least one position locator power contact, wherein the at least one base case power contact comprises a protrusion configured for receipt within a loop of the at least one position locator power contact;

wherein, when the position locator is attached to the base case, the position locator supplies power through the at least one power contact on the base case and the at least one position locator power contact of the position locator to activate the NFC sensor on the base case.

14. A multifunctional position locator as in claim 13, wherein the hardware is selected from a group of a brand logo, a lock, a handle, or a pull rod middle plate.

15. A multifunctional position locator as in claim 14, wherein the hardware has at least two folding feet, wherein the body has at least two holes to allow the folding feet to pierce through to receive the hardware attached on it.

16. A multifunctional position locator as in claim 13, wherein the hardware has a recess to receive the base case.

17. A multifunctional position locator as in claim 13, wherein the base case further comprises at least two holes, which allow folding feet on the hardware to pierce through so that the base case is fixed on the back of the hardware.

18. A multifunctional position locator as in claim 13, wherein the position locator is removably fixed to the base case by a screw.

19. A multifunctional position locator as in claim 13, wherein the position locator is removably fixed to the hardware by a fast clip.

* * * * *